US012087258B1

(12) United States Patent
Damato et al.

(10) Patent No.: US 12,087,258 B1
(45) Date of Patent: Sep. 10, 2024

(54) ELECTRIC GUITAR WITH ROTATABLE NECK

(71) Applicant: Krantz Productions AB, Hamneda (SE)

(72) Inventors: Adam Damato, Grand Rapids, MI (US); Mattias Krantz, Hamneda (SE)

( * ) Notice: Subject to any disclaimer, the term of this patent is extended or adjusted under 35 U.S.C. 154(b) by 0 days.

(21) Appl. No.: 18/435,215

(22) Filed: Feb. 7, 2024

(51) Int. Cl.
*G10D 3/06* (2020.01)
*G10D 1/08* (2006.01)

(52) U.S. Cl.
CPC ............... *G10D 3/06* (2013.01); *G10D 1/085* (2013.01)

(58) Field of Classification Search
CPC ................................ G10D 3/06; G10D 1/085
See application file for complete search history.

(56) References Cited

U.S. PATENT DOCUMENTS 4,981,063 A * 1/1991 Roberts .................. G10D 1/085 84/267
5,251,526 A * 10/1993 Hill ........................ G10D 1/085 84/293

* cited by examiner

*Primary Examiner* — Jianchun Qin
(74) *Attorney, Agent, or Firm* — Larisa Migachyov

(57) ABSTRACT

An electric string instrument is disclosed, comprising a body portion and a rotating neck portion, where the neck portion comprises strings all around its circumference and can rotate around its axis. Each string comprises an electric pickup, and a slip ring or a wireless connection connects all the pickups to the body of the string instrument.

17 Claims, 8 Drawing Sheets

ELECTRIC GUITAR WITH ROTATABLE NECK

CROSS-REFERENCE TO RELATED APPLICATIONS

None.

BACKGROUND

Field of the Invention

The present invention relates generally to musical instruments, and more specifically to electric stringed musical instruments, such as electric guitars.

Background of the Invention

The guitar has been a highly popular musical instrument since the fifteenth century, and became even more popular when the electric guitar was invented in 1932. While the overall design of the electric guitar has been standardized, many variations and alternative designs exist.

One issue associated with the current design of the electric guitar is its inability to comfortably support more than 9-10 strings. This is primarily due to the flat fretboard construction, which necessitates a wider neck to accommodate additional strings. Consequently, this design hinders a player's ability to reach across the strings while keeping the thumb properly supported against the back of the neck, a fundamental aspect of the standard guitar-playing technique.

Another problem associated with the current design of the electric guitar is that it is very difficult and cumbersome to switch out strings while in performance. If a player wants to switch between guitar and bass, even though the fretting system is the same, the player would need to carry around two instruments. If a player wishes to play a fretless bass, that will be another instrument to carry around. Some guitars have two necks to accommodate this issue, but even with such a design, a player needs to move their hand from one neck to the other, which prevents these transitions from being truly seamless.

A need exists for a guitar design that can accommodate more strings and that can comfortably switch between guitar strings and bass strings (or other strings, such as cello, banjo, or ukulele strings) for greater versatility.

SUMMARY OF THE INVENTION

An object of the present invention is to provide an electric stringed musical instrument that gives the player more strings than the standard 6-7 provided by a standard guitar.

Another object of the present invention is to provide an electric stringed musical instrument that comprises both guitar strings and bass strings.

The electric stringed musical instrument of the present invention comprises a body portion and a rotating neck portion, attached to the body in such a way that it is able to rotate around its own axis. The neck portion comprises a plurality of strings each of which is coplanar to the rotational axis; each string comprises an electric pickup. In an embodiment, a motor is attached to the rotating neck portion in such a way as to rotate it with respect to the body portion.

The neck comprises a plurality of frets; in some embodiments, the frets go all the way around the circumference of the neck so that each string is fretted. In some embodiments, the frets go only part of the way around the circumference of the neck so that some strings are not fretted.

In an embodiment, a thumb rest is also included. The thumb rest is attached to the body and attached to the other end of the neck in a way that enables the neck to rotate.

In an embodiment, at least four of the strings are bass strings; in another embodiment, at least six strings are guitar strings.

The electric pickups are connected to the output jack located on the body. The connection can be either wireless or a slip-ring electrical connector.

The rotating neck portion can be a conical frustum or a pyramidal frustum. A pyramidal frustum neck can comprise four or more sides.

In an embodiment, the rotating neck portion can have cutouts under the thicker strings.

The rotating neck portion can be rotated by a motor. The motor is controlled by a motor controller, which can rotate it clockwise, counterclockwise, or stop it at any position. In an embodiment, the motor controller can position the neck at certain pre-set position or move it in pre-set movement patterns. In an embodiment, the stringed electric musical instrument also comprises a brake that can control rotational resistance, fix the rotating neck in place, or index between multiple pre-defined positions.

The stringed electric musical instrument can comprise 18 strings, 24 strings, or any other number of strings.

LIST OF FIGURES

DETAILED DESCRIPTION OF THE PREFERRED EMBODIMENT

The present invention can be any stringed musical instrument with electric pickups for the strings, such as an electric violin, cello, or bass. An electric guitar is described in the below disclosure; however, nothing in this disclosure is intended to limit the invention to just that instrument.

Figure 1:
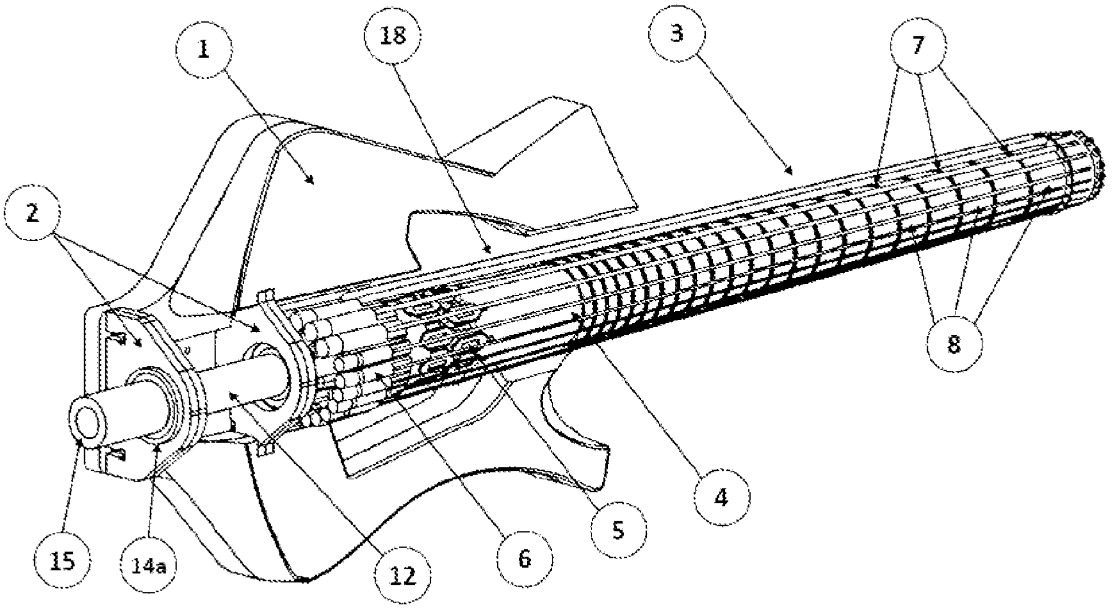
FIG. 1 is an overview of an embodiment of the present invention.

As shown in FIG. 1, an embodiment of the present invention is a guitar with a rotating neck that can turn and/or spin with relation to the body of the guitar. The neck 3 comprises strings 19 all around its circumference, placed in such a way that the outermost surface of each string is equidistant from the center of the rotating neck (this allows for a smooth strum when rotating the neck so that the pick can glide across all the strings with no bumps). Each string has an individual electric pickup 5; frets 7 are positioned in such a way as to produce the right musical notes, just as in a regular guitar. A slip ring is connected to all the electric pickups to connect them to the guitar body and thus to the amplifier.

The body 1 of the guitar is preferably approximately the same shape as the body of a regular electric guitar and made of a solid piece of material, similar to a regular electric guitar. However, the present invention is not limited by body shape or parameters, as long as the body of the guitar is solid enough to attach the bearings that hold the rotating neck.

The neck may spin freely or may be controlled by a motor, or may be controlled by a mechanical system that allows the indexing of positions, adjusting rotational resistance, or rotational locking. In an embodiment, a motor controls the speed and direction of rotation. The motor may be controlled by a foot pedal, similarly to other electric guitar controls. In an embodiment, the motor may be controlled by a motor controller that comprises various pre-set patterns of rotations and stopping points.

In an embodiment, a motor is not used, and the neck is simply controlled by a brake. The brake could be a simple brake that prevents rotational motion and locks the neck in place. In other embodiments, the brake could adjust the rotational resistance of the neck, or allow the neck to only rotate between indexed predefined positions.

An advantage of the present design is that it can accommodate a lot more strings than a standard guitar while allowing the player to easily reach all of the strings. As noted above, the width of the neck of a standard guitar increases as the number of strings increases, making it impossible for the average player to reach all of the strings while holding the neck and using the thumb to brace against the back of the neck, and thus, is limited to 9 or 10 strings with normal string spacing. While techniques such as tapping allow a guitarist to reach across a wider neck without bracing the thumb, it is not ergonomic and does not allow for comfortable playing. The present design can accommodate up to 32 strings in some cases and can accommodate guitar and bass strings (or other instrument strings such as cello, banjo, violin, or ukulele strings) at the same time.

Another advantage of the present design is that a musician can easily strum the guitar by simply spinning the neck and holding a pick in place. The tuning for such a strum may be an open chord so that it is easy to change the chord by simply holding down a slide against the fret as the neck rotates. Using a slide in guitar playing involves placing a cylindrical object, typically made of glass or steel, atop the guitar strings. By sliding this object along the strings without pressing them down onto the fretboard, the player can produce notes. This method allows for the alteration of pitch through the slide's movement, facilitating continuous note production, even during the rotation of the guitar's neck. This technique is particularly effective for seamless musical transitions between different sections of the instrument, such as guitar to bass, enriching the overall musical expression.

Another advantage of the present design is that since the strings are not all coplanar, it may be played with a bow, like a violin or cello. Bowing the strings while the neck is turning is another way to result in an interesting sound.

The present design can accommodate a large number of strings compared to a standard guitar. The present design can easily accommodate up to 32 strings if they are all guitar strings, or fewer if some of them are bass strings (since those strings are thicker and need to be spaced further apart). In an embodiment, the present design comprises 9 guitar strings, 5 fretted bass strings, and 4 fretless bass strings. The fact that the present design can encompass guitar strings, bass strings, and fretless bass strings, while allowing the average player to easily reach all of the strings, results in a richer sound and grants the player much greater musical possibilities.

The tuning of the present design can be any tuning that is practical or possible on a guitar, bass, cello, or any other string instrument. In an embodiment, the tuning is an open tuning, wherein all the strings are tuned to notes in the same chord. This enables the player to strum all the strings by rotating the neck and produce a consonant sound (a player can use a slide to fret the chord for that purpose, since it can glide easily across the strings as the neck rotates). In another embodiment, the tuning for 6 of the guitar strings is a standard guitar tuning (EADGBE) and the tuning for 4 of the bass strings is a standard bass tuning (EADG). It is to be understood that the present invention is not limited to any particular tuning, and that any tuning of the strings is consistent with the present invention.

The neck portion 3, as shown here, is a conical frustum. In the preferred embodiment, it has a draft angle of about 1-2 degrees, similar to a regular guitar. Other draft angles may also be included in the present invention, as long as they are comfortable to play.

Figure 3:
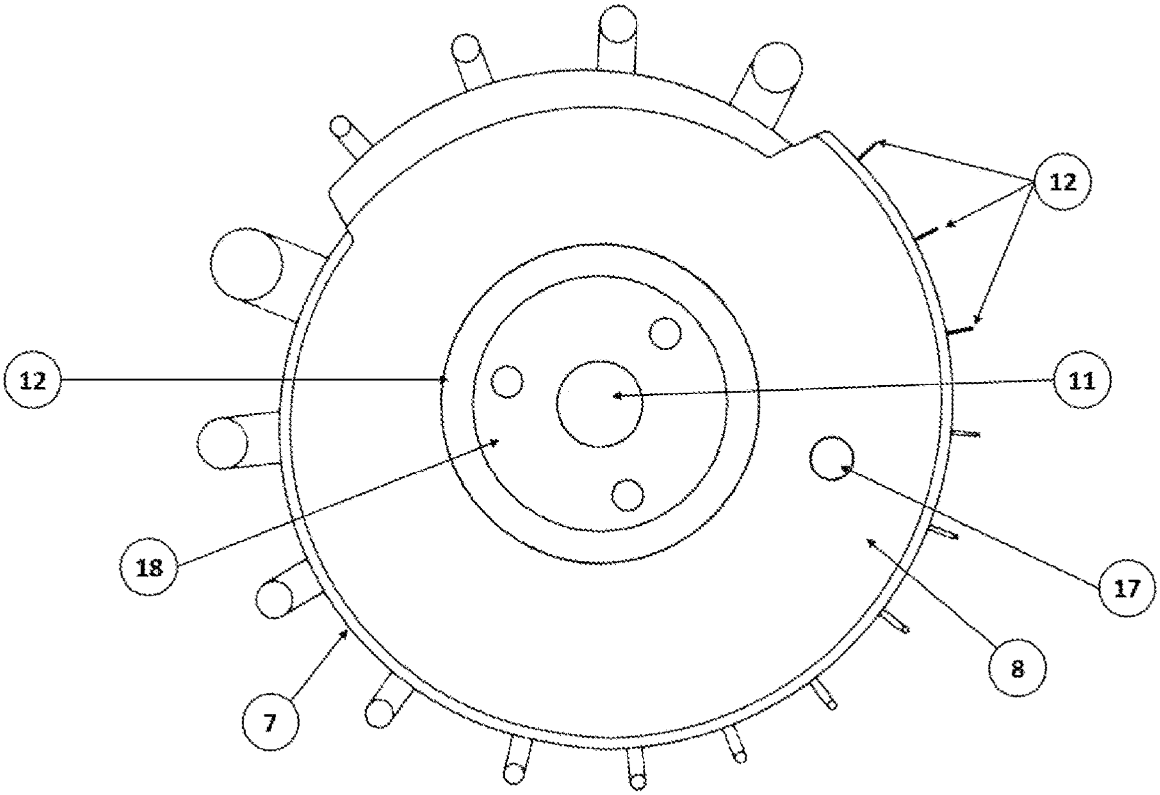
FIG. 3 is a cross-sectional view of an embodiment of the rotating neck portion of the present invention.

As shown in the Figure, each string is preferably equidistant from the axis of rotation of the neck. Since the strings are not all the same thickness, this might, in some embodiments, require a cutout under the thicker strings, to enable them to be played. FIG. 3 shows a sample cross-section of a conical frustum neck of the present invention, comprising extra cutouts under the thicker strings. This is especially important for embodiments requiring thick gauge bass strings.

The diameter of the neck portion at its thickest point is about 67 mm in the present model. It is preferable to keep the diameter as small as possible while maintaining comfortable string spacing. This enables a typical adult hand to easily reach around it without strain. In an embodiment, the diameter of the neck portion is anywhere between 20 mm (a standard guitar neck) up to 67 mm. It is to be understood that any other diameter is also consonant with the present invention.

In an embodiment (not shown), the neck portion 3 is a pyramidal frustum comprising multiple flat faces, with at least two strings on each face. The pyramidal frustum can comprise at least four flat faces, with six or eight faces also possible. This enables a more normal-feeling playing experience on each face, since the fretboard will be flat rather than curved. In an embodiment, each face comprises the string set of a particular instrument—for example, one face could contain 6 guitar strings, one face could contain 4 bass strings, one face could contain 4 fretless bass strings, and so on. In another embodiment, each face comprises a guitar string set, with custom tunings for each face. The draft angle of this design is preferably similar to that of the conical frustum design-approximately 1-2 degrees.

In an embodiment, the neck is a cylinder or a prism instead of a frustum, having no draft angle.

Figure 2:
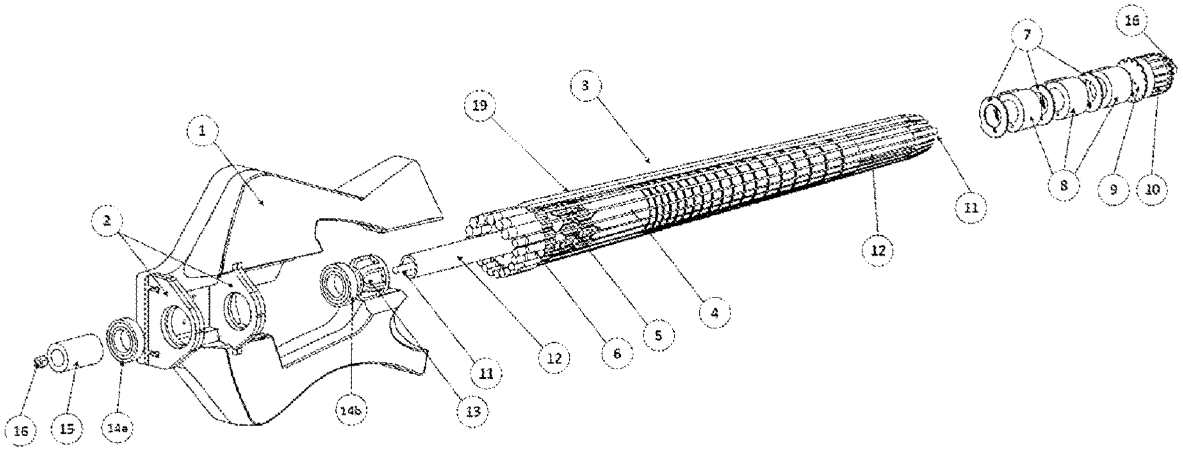
FIG. 2 is an exploded view of an embodiment of the present invention.

As shown in the FIGS. 1 and 2, tensioners 6 adjust the string height up and down to allow the player to control the action. The tensioners 6 can be off-the-shelf standard tensioners used for headless electric guitars; they can move along the slot and adjust the string height up and down. In this embodiment, the tensioners are mounted into a threaded insert or tapped hole 6*a*.

As shown in the exploded view, frets 7 are circular in this design. Each fret is unique to accommodate the neck taper, and is sized to have the optimal playing height for each string. Fret spacers 8 provide sufficient space between the frets; each fret spacer is unique to account for taper and the varying heights between frets. In an embodiment, some of the strings are not fretted—in that case, the fret spacers have a lip that is the same height as the thickness of the frets, so that the surface of the fretless section is smooth and has no visible frets.

Since this is an electric instrument, each string is equipped with an electric pickup 5. In an embodiment, the electric pickups 5 are single-string single-coil pickups, each having a resistance of 8 k Ohms. They consist of a magnet and a wire coil, detecting string vibrations and converting them into electrical signals. Each pickup connects via two wires: a signal wire for audio output and a ground wire for electrical grounding. In an embodiment, these wires are wired in parallel to a slip ring assembly, ensuring continuous signal transmission to the guitar's output jack, regardless of the neck's rotational movement. In another embodiment, the pickups are connected to a wireless transmitter. The wireless transmitter can be a transmitter operating on the 2.4 GHz frequency band or any other wireless transmitter that can transmit signals.

Since these electric pickups are located very close together on a curved surface of the neck, they have to be physically small. In an embodiment, each electric pickup is 12.9 mm wide and 7.4 mm tall. These dimensions are not meant to be limiting, and other measurements are acceptable for the present invention as long as all the electric pickups fit on the rotating neck under the strings.

String bridge 9 has cut-outs for all the strings at the right height. In an embodiment, the string bridge 9 is adjustable so that the player can change the string type or string tuning. Centering ring 18 centers the string bridge in place to align it.

String clamps 10 route the strings through and clamp onto the ends of the strings to hold them in place. Any clamps may be used for the purpose.

Threaded rod 11 runs through the entirety of the rotating neck and provides stability and structural support by clamping all the elements together, running from string clamps 10 to the end cap 15. This increases rigidity, maintains alignment, and reduces vibration. Rod nut 16 clamps the rotating neck together, providing stiffness. In an embodiment this could be accomplished through the structure of the guitar without the need of a threaded rod.

The threaded rod runs through a central tube 12, which is slightly shorter than the threaded rod, running between the string bridge 9 and the end cap 15. It is preferably made of aluminum, but could be made of other structurally stable materials. Tube spacer 13 is bolted to the base mounting structure 4 to give the ends of the tensioners more room so that they do not rub against the bearing. In an embodiment, the base mounting structure and the tube spacer are one part.

Bearing housings 2 and bearings 14*a* and 14*b* are used to hold the neck in place while still enabling it to rotate around its axis. The two bearing housings 2 consists of four separate plates that are arranged in a way such that the two outer-most plates support the bearings radially, while the inner two plates have a slightly smaller through-hole. This allows the bearings to be clamped together while spaced apart, which ensures structural stability and minimizes undesired movement when in use.

Slip ring 15 is used to connect the electric pickups 5 to the guitar body and thus to the amplifier. In an embodiment, a wireless connection (such as a 2.4 GHz wireless transmitter) is used instead of a slip ring.

In an embodiment, the motor controller may rapidly turn the neck back and forth slightly, so that when a player holds a pick against the string, a tremolo is produced. This enables much greater precision and a better sound for the tremolo.

In an embodiment, the motor controller can store and reproduce a sequence of movements (clockwise, counter-clockwise, stop) for an entire song or a part of a song. The player then simply has to play the right chords and hold the pick.

In an embodiment, the motor controller can store and reproduce a sequence of positions, moving the neck to put a particular string or set of strings into playing position. For example, the motor controller can position the bass strings in playing position for a certain time, then the guitar strings, then the fretless bass strings. This can also be done with a set of buttons that can be pressed with the foot. For example, a button can trigger the motor to move the neck to the guitar section; another one can trigger the neck to move to the bass section; another one to the fretless bass section. This allows position changes to be done without interrupting the player's performance; this is not achievable without the motor.

In an embodiment, the motor for the guitar's rotating neck is a NEMA 17 stepper motor, chosen for its precision in incremental movements. It is operated by a TMC2209 driver, which allows for fine control through PWM and digital inputs. The ESP32 microcontroller orchestrates the movement commands, while an AS5600 magnetic encoder tracks the neck's position to ensure accurate placement for position control. It is to be understood that any other motor or driver/encoder that provides similar precision in movements and fine motor control is also consistent with the present invention.

In an embodiment, the motor controller stores simple movement sequences in its memory, to be executed later. In an embodiment, a user can program movement sequences into the motor controller via a phone app, a computer interface, or a simple interface on the guitar itself.

Figure 6:
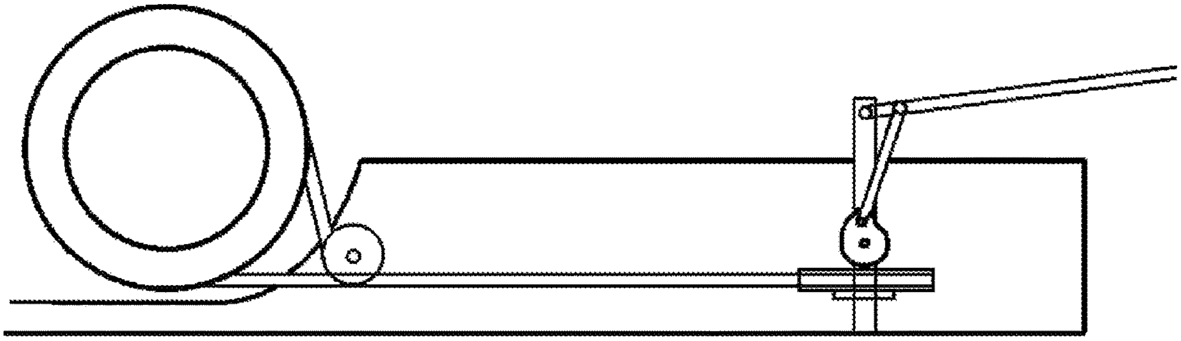
FIG. 6 is a view of an embodiment of the brake part of the present invention.

In an embodiment, a brake is used instead of a motor. FIG. 6 shows an embodiment of a brake; as shown, a cam lock is used to apply friction to the central aluminum tube of the barrel. In this embodiment, the tremolo bar has a rotational and vertical component. By using a cam lock along with the vertical component, the amount of friction applied to the central aluminum tube could be adjusted so that when the tremolo bar is lifted, the barrel would free-spin, and when the tremolo bar is fully locked down, rotating it would also rotate the barrel, since it creates friction between the pulley and the rotating vertical rod. The cam lock also allows the same force to be used whether or not it is held down by the player.

Figure 7:
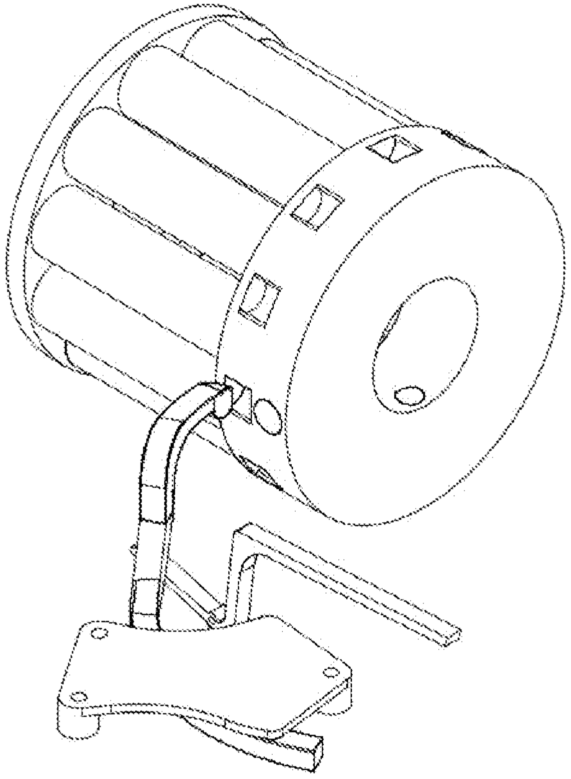
FIG. 7 is a view of another embodiment of the brake part of the present invention.
Figure 8:
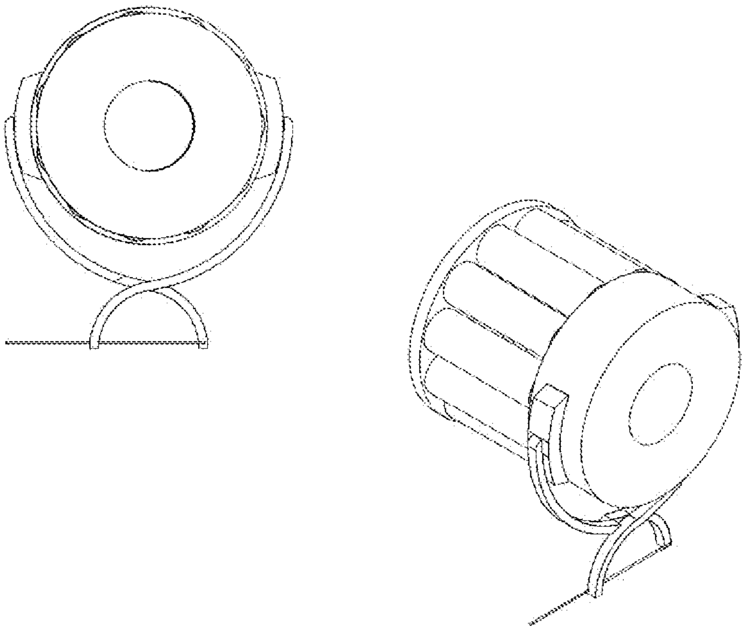
FIG. 8 is a view of another embodiment of the brake part of the present invention.

FIG. 7 shows an alternate embodiment of a brake that provides indexing. There could be any number of indexed positions. An alternate brake design (not shown) can use magnets to provide indexing. FIG. 8 shows another alternate embodiment of a brake that provides friction in the style of a bike wheel brake. It is to be understood that any other brake that provides friction to stop the rotation of the rotating neck or to provide resistance to the rotation is also acceptable for practicing the present invention.

Figure 4:
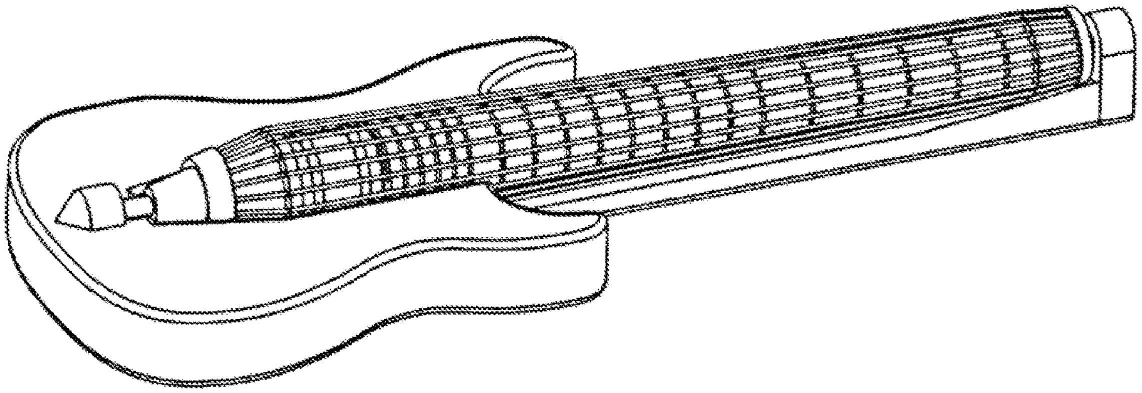
FIG. 4 is a view of an alternate embodiment of the present invention.

FIG. 4 shows an optional thumb rest 20 for the present invention. The thumb rest 20 is rigidly attached to the body portion and provides support for the neck. This enables the player to brace their left thumb against it while fretting the strings; without the thumb rest, the player would have to hold on to the strings on the opposite side of the strings to be played, which may produce unexpected noise. As shown, the thumb rest 20 provides a bearing at the distal side of the neck, as shown, to enhance the neck's stability.

Figure 5:
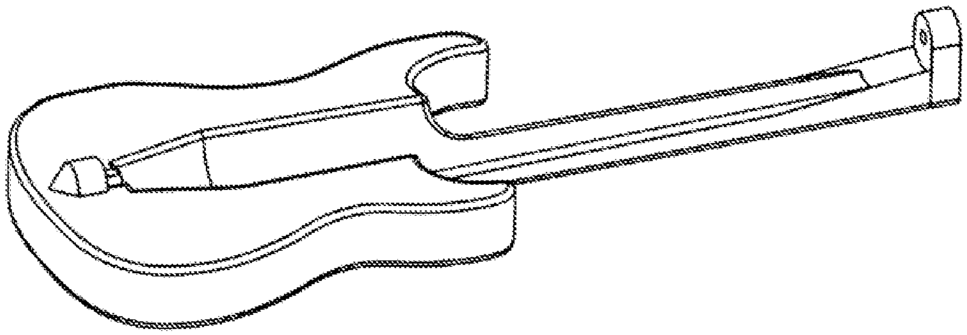
FIG. 5 is a view of the thumb rest of an alternate embodiment of the present invention.

In the embodiment shown in FIG. 4, the diameter of the neck has to be smaller so that the player's hand fits comfortably around both the thumb rest and the neck. In an embodiment, the distance from the front side of the neck to the back side of the thumb rest at the 12th fret of the guitar is no greater than 90 mm. The width of the thumb rest is preferably about the same width as a standard guitar neck. FIG. 5 shows the guitar body with the thumb rest attached and with the neck not present, to provide a clearer idea of its shape. The thumb rest covers approximately ⅓ to ½ of the neck's circumference; the side of the thumb rest that faces the neck is curved to match the curve of the neck.

It is to be understood that the present invention is only limited by the appended claims. The embodiments described in this section of the disclosure are illustrative only.

The invention claimed is:

1. A stringed electric musical instrument, comprising:
- a body portion;
- a rotating neck portion attached to the body portion in a way that enables the rotating neck portion to rotate around its own axis, the rotating neck portion comprising:
  - a plurality of strings, each individually coplanar to a central axis of the rotating neck portion;
  - for each of the plurality of strings, an electric pickup located in such a way as to amplify the sound of the string;
- wherein the rotating neck portion is a tapered conical frustum, and where the strings are located in such a way that each string is equidistant from the axis of the rotating neck portion.

2. The stringed electric musical instrument of claim 1, further comprising:
- a motor attached to the rotating neck portion in such a way as to rotate the rotating neck portion with respect to the body portion.

3. The stringed electric musical instrument of claim 1, further comprising:
- a thumb rest extending from the body along the length of the rotating neck portion and parallel to the axis of the rotating neck portion, comprising a proximal end and a distal end, wherein the proximal end is attached to the body and the distal end is attached to an end of the rotating neck portion that is not attached to the body portion, in such a way that the rotating neck portion is free to rotate with respect to the thumb rest.

4. The stringed electric musical instrument of claim 1, wherein the rotating neck portion comprises a plurality of frets, wherein the frets go around the entire circumference of the rotating neck portion.

5. The stringed electric musical instrument of claim 1, wherein the rotating neck portion comprises a plurality of frets, wherein the frets only cover part of the circumference of the rotating neck portion in such a way that at least one string is not fretted.

6. The stringed electric musical instrument of claim 1, wherein at least four of the plurality of strings are bass strings.

7. The stringed electric musical instrument of claim 1, wherein at least six of the plurality of strings are guitar strings.

8. The stringed electric musical instrument of claim 1, further comprising:
- an output jack located on the body portion;
- a connector connecting the plurality of electric pickups to the output jack.

9. The stringed electric musical instrument of claim 6, wherein the connector is a slip-ring electrical connector.

10. The stringed electric musical instrument of claim 6, wherein the connector is a wireless connector.

11. The stringed electric musical instrument of claim 1, comprising at least one bass string, wherein the rotating neck portion comprises a cutout to accommodate the at least one bass string.

12. The stringed electric musical instrument of claim 1, further comprising:
- a motor controller for controlling the motor, wherein the motor controller is able to cause the motor to perform at least these actions:
  - rotate clockwise;
  - rotate counterclockwise;
  - stop.

13. The stringed electric musical instrument of claim 12, wherein the motor controller is able to position the rotating neck portion at at least two distinct pre-set positions.

14. The stringed electric musical instrument of claim 12, wherein the motor controller is able to cause the motor to perform a combination of at least two distinct movements as a pre-set movement pattern.

15. The stringed electric musical instrument of claim 1, further comprising:
- a brake, wherein the brake is configured in such a way as to perform at least one of the following:
  - stop the rotating neck portion from rotating with respect to the body portion;
  - adjust rotational resistance of the rotating neck portion with respect to the body portion;
  - allow the rotating neck portion to switch between at least two indexed positions with respect to the body portion.

16. The stringed electric musical instrument of claim 1, comprising at least 18 strings.

17. The stringed electric musical instrument of claim 1, comprising at least 32 strings.

* * * * *